Dec. 3, 1968     C. J. ROBERTS     3,414,211
REEL FOR LAWN MOWER CONTROL

Filed May 10, 1967     2 Sheets-Sheet 2

Inventor:
Clifford James Roberts,
by
Attorneys

United States Patent Office 3,414,211
Patented Dec. 3, 1968

3,414,211
REEL FOR LAWN MOWER CONTROL
Clifford J. Roberts, Hitchin, England, assignor of one-half to George H. Nadel
Filed May 10, 1967, Ser. No. 637,563
4 Claims. (Cl. 242—85)

ABSTRACT OF THE DISCLOSURE

A rachet selected one-way rotatable drum on a vertical axle mounted in the ground pays out line which is wrapped around the drum to control a self-propelled mower attached to the end of the line. The diameter of the drum can be selected to determine the width of the spiral path followed by the mower and the rachet permits the drum to rotate when the line has been unwound to a preselected stop, thereby providing a circular path at the selected maximum diameter until the mower is shut down.

Background of the invention

The field of this invention is tethered control devices, particularly those programmed to cover a predetermined area by systematic motion.

The prior art includes tethered guides for machines which are not wholly automatic in their operation and cannot be readily set up for use under various conditions.

Summary

The present invention permits a tethered guide for a lawn mower or the like which is simple and accurate to operate for cutting a circular area of predetermined size using a spiral path of selectable pitch. At the end of the mowing cycle the mower repeats its maximum arcular path until shut down.

Brief description of the drawings

The invention is illustrated in the accompanying drawings.

Description of the preferred embodiment

Figure 1:
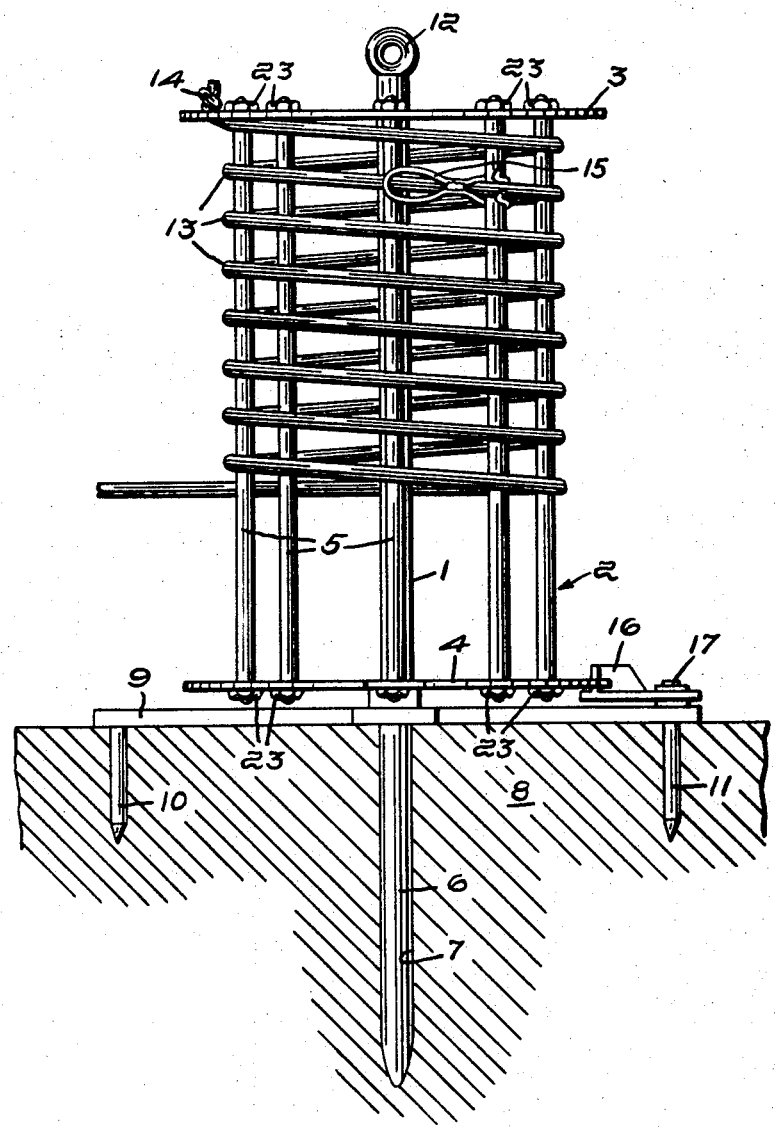
FIGURE 1 shows a side elevation of one embodiment of the device mounted on the ground.

In FIGURE 1, a shaft 1 has a drum 2 comprising end-plates 3 and 4 connected by struts 5, mounted coaxially thereon. The end 6 of the shaft 1 fits into a hole 7 in the ground 8. A platform 9 is rigidly fixed to the shaft 1 and carries spikes 10 and 11 which are stuck into the ground 8, thus preventing the shaft 1 from rotating relative to the ground 5 (or about its longitudinal axis). Ratchet means are provided as hereinafter described so that the drum can rotate in one direction but not the other. The device includes a ring 12 which enables the device to be raised from the ground as desired.

One end of a cord 13 is fixed to the drum at 14 while substantially all the remainder of the cord is wound round the drum, the other end of the cord being fixed to a self-propelled machine (not shown).

Figure 3:
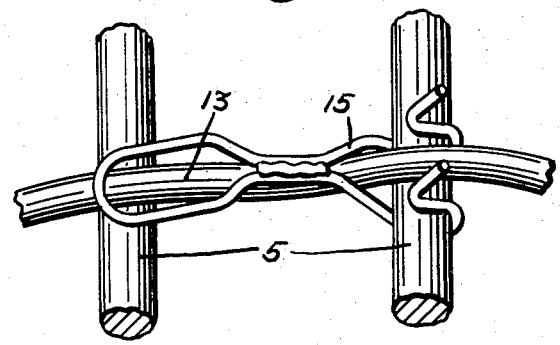
FIGURE 3 shows a detail of FIGURE 1.

When the device is being used, the machine is set so that its initial direction of motion is more or less tangential to a circle centered on the drum and is in an opposite sense to the sense in which the cord is wound about the drum and the ratchet device prevents the drum from rotating. For example, if the cord is wound anti-clockwise about the drum the ratchet device is set to allow the drum to rotate freely in a clockwise direction but to prevent it from rotating in an anti-clockwise direction and the machine should be arranged so that it moves in a clockwise direction about the drum. After ensuring that the cord is taut the machine is then set in motion, and it follows a spiral path so as to unwind the cord from the drum until the cord has been unwound to a prearranged extent, as determined by suitably attaching the cord to a predetermined point thereof to the drum e.g. by a detachable clip 15 (FIGURE 3), whereupon the drum will tend to move in the same direction as the machine (in the present instance a clockwise direction); such movement of the drum being allowed by the ratchet device, the machine describes a circular path about the drum until it is stopped.

The aforementioned ratchet device comprises a pawl 16 pivoted for horizontal movement about a pivot 17 mounted on the platform 9 and capable of engaging the ratchet formed by slots 18 in the end-plate 4 of the drum 2. The pawl 16 can be set in either of positions A and B. In position A, the pawl allows the drum 2 to turn in a clockwise direction about the shaft 1, but prevents the drum from turning in an anti-clockwise direction. In position B, the allowed and the prevented directions are reversed. The pawl 16 should therefore be set in position A when the cord is wound anti-clockwise about the drum and the self-propelled machine is to move in a clockwise direction about the device, and in position B when the cord is wound clockwise about the drum and the machine is to move in an anti-clockwise direction.

The cord used may of course be of any suitable material. For example, it may be a cotton or nylon rope, or a metal cord, or even a chain. The choice of cord, will of course, depend to some extent on the circumstance in which it is used.

The device of the invention is particularly useful because it not only controls thhe direction of motion of the machine so that it follows a spiral path while the cord is being unwound, but also ensures that after the cord has been unwound to a prearranged extent the machine continues to move freely in a circular path without rewinding the unwound cord about the drum. The drum then begins to rotate and continues to do so while the machine follows a circular path about the drum until it is made to stop.

Figure 2:
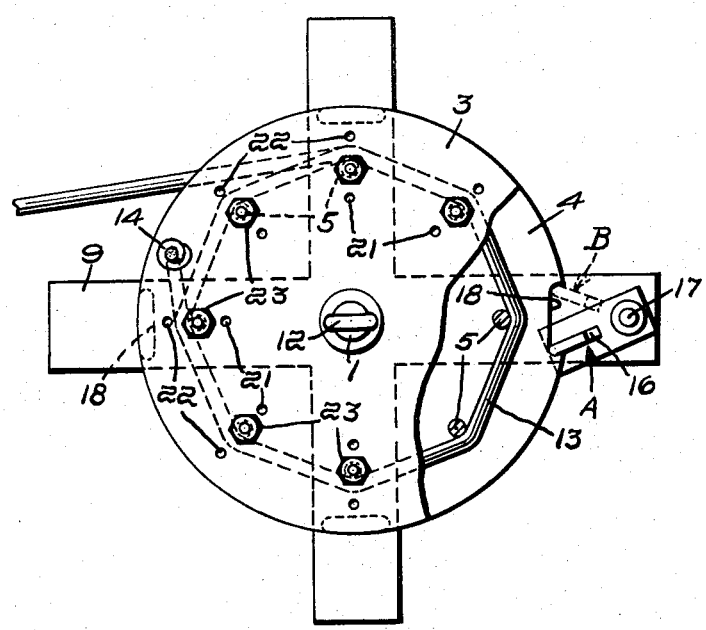
FIGURE 2 shows a plan view thereof.

Various diameters of the location circle for the struts 5 permit the effective diameter of the drum to be adapted to the width of cut achieved by a particular mower. If desired this diameter can be provided to be selected by the user. One such arrangement is indicated in FIGURE 2 where a set of holes 21 at a smaller diameter location and a set of holes 22 at a larger diameter location are indicated. By making the struts 5 so they can be readily disassembled from the end-plates 3, 4 and reassembled in a new set of holes 21 or 22, the width of the mower cut can be made to have the desired overlap. One way to provide this feature would be to extend the threaded ends of the struts 5 through the holes in end-plates 3, 4 and secure them with nuts 23 as indicated in FIGURE 1.

Other modifications in the construction can be made with the aid of the present teaching without departing from the scope of the appended claims.

I claim:

1. A control device for automatically controlling the direction of motion of a self-propelled machine comprising a shaft capable of being mounted substantially vertically relative to the ground, means to prevent the shaft from rotating relative to the ground, a drum mounted on shaft, means for attaching one end of a cord for rotation with the drum so that the cord can be wound round the drum and the other end can be attached to the machine whereby, when the machine is set in motion, the cord can be progressively unwound so that the machine is constrained to move away from the device along a generally spiral path, means for attaching the cord at a predetermined point thereof to said drum, means to prevent the drum from rotating in the opposite direction to that of the machine until the cord has been unwound to a prearranged extent, and to allow the drum to rotate in the same direction as that of the machine, after the cord has been unwound to said extent so that the machine is then constrained to move in a circular path centered on the device.

2. A device according to claim 1 in which the means to prevent the shaft from rotating relative to the ground comprises a platform for said shaft having spikes which can be stuck into the ground.

3. A device according to claim 2 wherein said means to prevent the drum from rotating comprises a ratchet device having a pawl engageable with a slot in the drum so as to allow rotation of the drum in one direction but not in the other direction.

4. A device according to claim 1 in which said drum includes means for selectively altering the effective diameter of the drum.

References Cited
UNITED STATES PATENTS

| | | | |
|---|---|---|---|
| 555,516 | 3/1896 | Knox | 242—85 |
| 1,488,541 | 4/1924 | Hasen | 242—85 |
| 2,555,457 | 6/1951 | Rose | 242—100 |

FRANK J. COHEN, *Primary Examiner.*

NATHAN L. MINTZ, *Assistant Examiner.*